United States Patent
Koenig et al.

(10) Patent No.: US 8,708,266 B2
(45) Date of Patent: Apr. 29, 2014

(54) SYSTEM FOR CRUSHING WITH SCREW PORITION THAT INCREASES IN DIAMETER

(75) Inventors: Mark E. Koenig, Pickerington, OH (US); Larry E. Koenig, Canal Winchester, OH (US)

(73) Assignees: Mark E. Koenig, Pickerington, OH (US); Larry E. Koenig, Canal Winchester, OH (US)

( * ) Notice: Subject to any disclaimer, the term of this patent is extended or adjusted under 35 U.S.C. 154(b) by 344 days.

(21) Appl. No.: 13/007,864

(22) Filed: Jan. 17, 2011

(65) Prior Publication Data

US 2012/0145815 A1   Jun. 14, 2012

Related U.S. Application Data

(60) Provisional application No. 61/421,505, filed on Dec. 9, 2010.

(51) Int. Cl.
*B02C 19/22* (2006.01)

(52) U.S. Cl.
USPC .................................................... 241/260.1

(58) Field of Classification Search
USPC ........ 241/203, 260, 260.1; 100/117, 145, 146
See application file for complete search history.

(56) References Cited

U.S. PATENT DOCUMENTS

| 728,516 A | 5/1903 | Trabue |
|---|---|---|
| 829,315 A | 8/1906 | Anderson |
| 1,221,054 A | 4/1917 | Hyatt |
| 1,506,036 A | 8/1924 | Willmarth |
| 2,470,278 A | 5/1949 | West |
| 2,576,784 A | 11/1951 | Galen |
| 2,615,387 A | 10/1952 | Messing |
| 2,823,603 A | 2/1958 | Collins |
| 2,902,922 A | 9/1959 | Williams |
| 2,982,201 A | 5/1961 | Raymond |
| 3,179,040 A | 4/1965 | Seltzer |
| 3,588,356 A | 6/1971 | Poux et al. |
| 3,787,830 A | 1/1974 | Cato |
| 3,866,529 A | 2/1975 | Holman |
| 3,877,365 A | 4/1975 | Berggren |
| 3,938,434 A | 2/1976 | Cox |
| 3,982,483 A | 9/1976 | Bird et al. |
| 4,037,528 A | 7/1977 | White |

(Continued)

OTHER PUBLICATIONS

FKC Co., Ltd., Biosolids Dewatering, sales literature, 2 pages, found at www.fkcscrewpress.com, copyrighted 2009.

(Continued)

*Primary Examiner* — Shelley Self
*Assistant Examiner* — Leonel Vasquez
(74) *Attorney, Agent, or Firm* — Standley Law Group LLP

(57) ABSTRACT

Exemplary embodiments are for a system for crushing a material that may include a compaction chamber and a screw assembly that generally extends between the proximal and distal ends of the compaction chamber. A portion of the screw assembly increases in diameter along a length of the shaft of the screw assembly such that the system is configured to crush material between the compaction chamber and the portion of the screw assembly that increases in diameter. The portion of the screw assembly that increases in diameter may be integral with the shaft of the screw assembly. An exemplary embodiment of the system may also include at least one wear member that is removably associated with the distal portion of the compaction chamber such that the wear member may assist with the crushing of material.

22 Claims, 12 Drawing Sheets

Detail C

(56) References Cited

U.S. PATENT DOCUMENTS

| | | | |
|---|---|---|---|
| 4,256,035 A | 3/1981 | Neufeldt | |
| 4,289,067 A | 9/1981 | Hanak | |
| 4,323,007 A | 4/1982 | Hunt et al. | |
| 4,355,905 A | 10/1982 | St. Louis et al. | |
| 4,516,492 A | 5/1985 | Olfert | |
| 4,636,127 A | 1/1987 | Olano et al. | |
| 4,709,628 A | 12/1987 | Glowacki | |
| 4,770,236 A | 9/1988 | Kulikowski | |
| 4,807,816 A | 2/1989 | Ataka | |
| 4,852,817 A | 8/1989 | Tipton | |
| 4,897,194 A | 1/1990 | Olson | |
| 4,951,884 A | 8/1990 | Koenig | |
| 5,040,736 A | 8/1991 | Obitz | |
| 5,108,040 A * | 4/1992 | Koenig | 241/260.1 |
| 5,114,331 A | 5/1992 | Umehara et al. | |
| 5,148,994 A | 9/1992 | Haider et al. | |
| 5,148,998 A | 9/1992 | Obitz | |
| 5,180,225 A | 1/1993 | Piccolo, Sr. et al. | |
| 5,308,003 A | 5/1994 | Koenig | |
| 5,373,923 A | 12/1994 | Koenig | |
| 5,383,397 A | 1/1995 | Battles | |
| 5,601,239 A | 2/1997 | Smith et al. | |
| 5,611,268 A | 3/1997 | Hamilton | |
| 5,662,035 A | 9/1997 | Lee | |
| 5,695,136 A | 12/1997 | Rohden et al. | |
| 5,735,199 A | 4/1998 | Esau | |
| 5,819,643 A | 10/1998 | Mcilwain | |
| RE36,023 E | 1/1999 | Koenig | |
| 5,873,304 A | 2/1999 | Ruf | |
| 6,247,662 B1 | 6/2001 | Hamilton | |
| 6,276,622 B1 | 8/2001 | Obitz | |
| 6,505,550 B2 | 1/2003 | Hamilton | |
| 6,793,165 B2 | 9/2004 | Obitz | |
| 6,945,487 B1 * | 9/2005 | Obitz | 241/260.1 |
| 7,011,018 B2 | 3/2006 | Schroeder et al. | |
| 7,226,213 B2 | 6/2007 | Kraft | |
| 7,229,526 B2 | 6/2007 | Obitz | |
| 7,234,915 B2 | 6/2007 | Obitz | |
| 7,360,639 B2 | 4/2008 | Sprouse et al. | |
| 7,523,996 B1 | 4/2009 | Darst | |
| 7,631,596 B2 * | 12/2009 | Williams et al. | 100/149 |
| 7,740,325 B1 | 6/2010 | Chen | |
| 7,828,482 B2 | 11/2010 | Beausoleil et al. | |
| 7,851,585 B2 | 12/2010 | Brison et al. | |
| 8,033,733 B2 | 10/2011 | Lang | |
| 2005/0069446 A1 | 3/2005 | Kriehn | |
| 2008/0028952 A1 | 2/2008 | Duperon | |
| 2008/0121497 A1 | 5/2008 | Esterson et al. | |
| 2010/0266230 A1 | 10/2010 | Hong | |

OTHER PUBLICATIONS

RUNI Danish Engineering, SK240, sales literature, 1 page, found at www.runi.dk, copyrighted 2009.

RUNI Danish Engineering, Screw Compactor, product information, 2 pages, found at www.compactor-runi.com, Apr. 19, 2011.

PolyMax, Polystyrene Foam Densifier, product information, 1 page, found at www.polyman5000.com, copyrighted 2006.

Intcorecycling.com, GreenMax Recycling Machine, product information, 1 page, found at www.intcorecycling.com, copyrighted 2009-2010.

Foam Equipment + Consulting Co., Heger Recycling Equipment, sales literature, 3 pages, found at www.foamequipment.com/heger.com, copyrighted 2011.

RecycleTech Corp., RecycleTech—The Environment Savers, company information, 1 page, found at www.recycletechno.com, copyrighted 2009.

Intcorecycling.com, GreenMax Recycling Machine, product information, 2 pages, found at www.intcorecycling.com, copyrighted 2009-2010.

Sebright Products, Inc., Bright Technologies—Innovators in Dewatering Equipment Technologies, product information, 2 pages, found at www.brightbeltpress.com, copyrighted 2006.

* cited by examiner

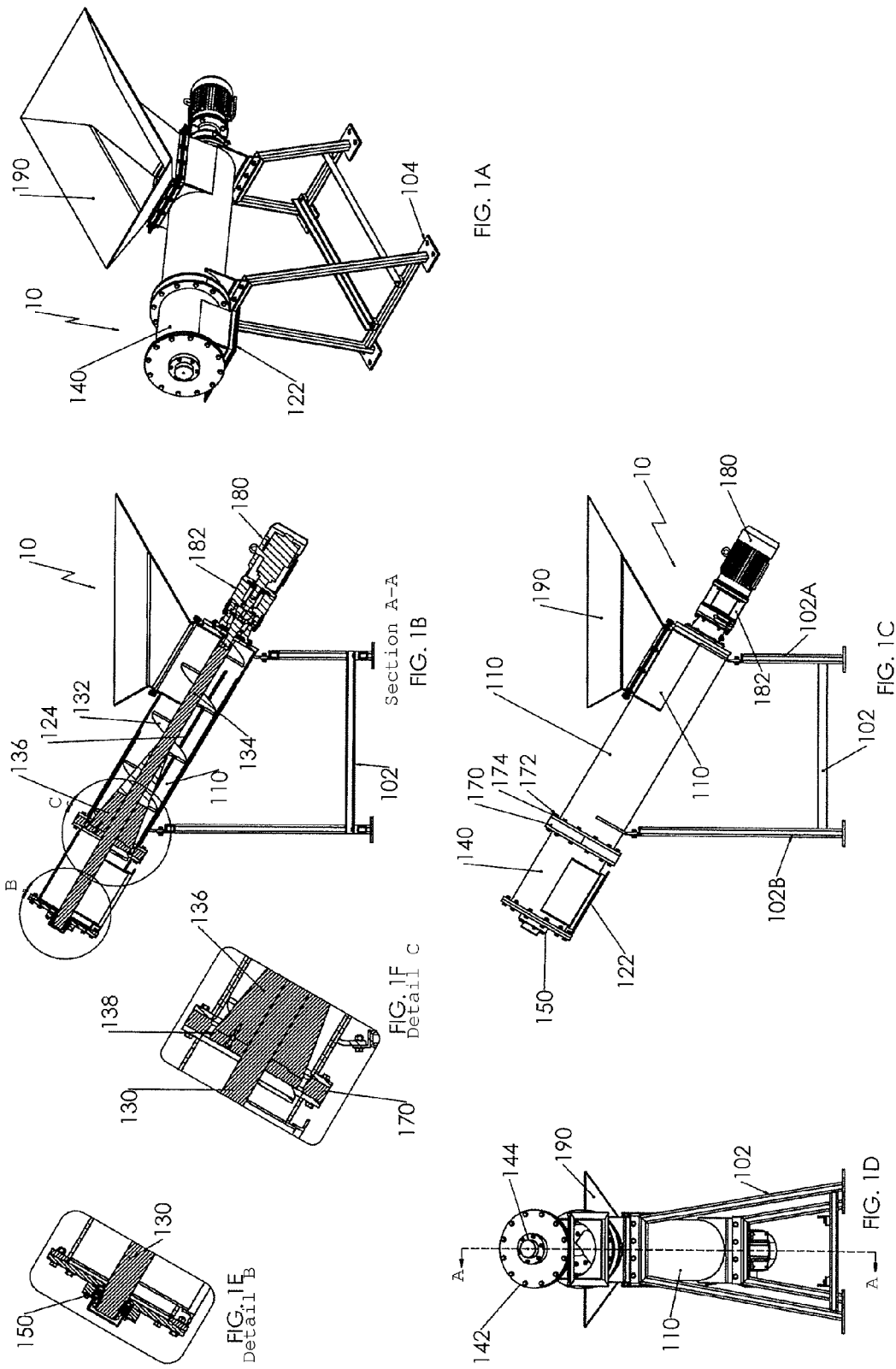

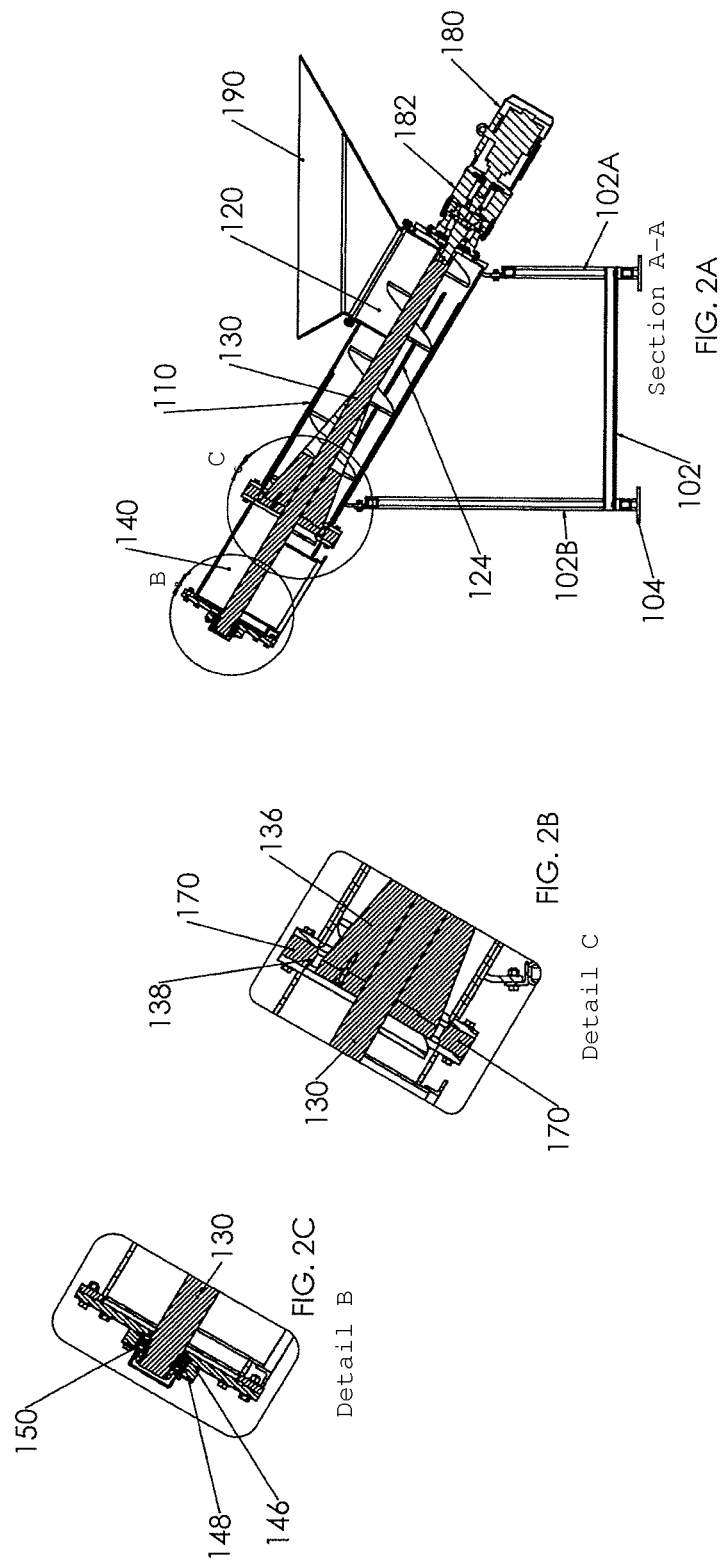

Detail C

Detail B

Outer Tube Removed

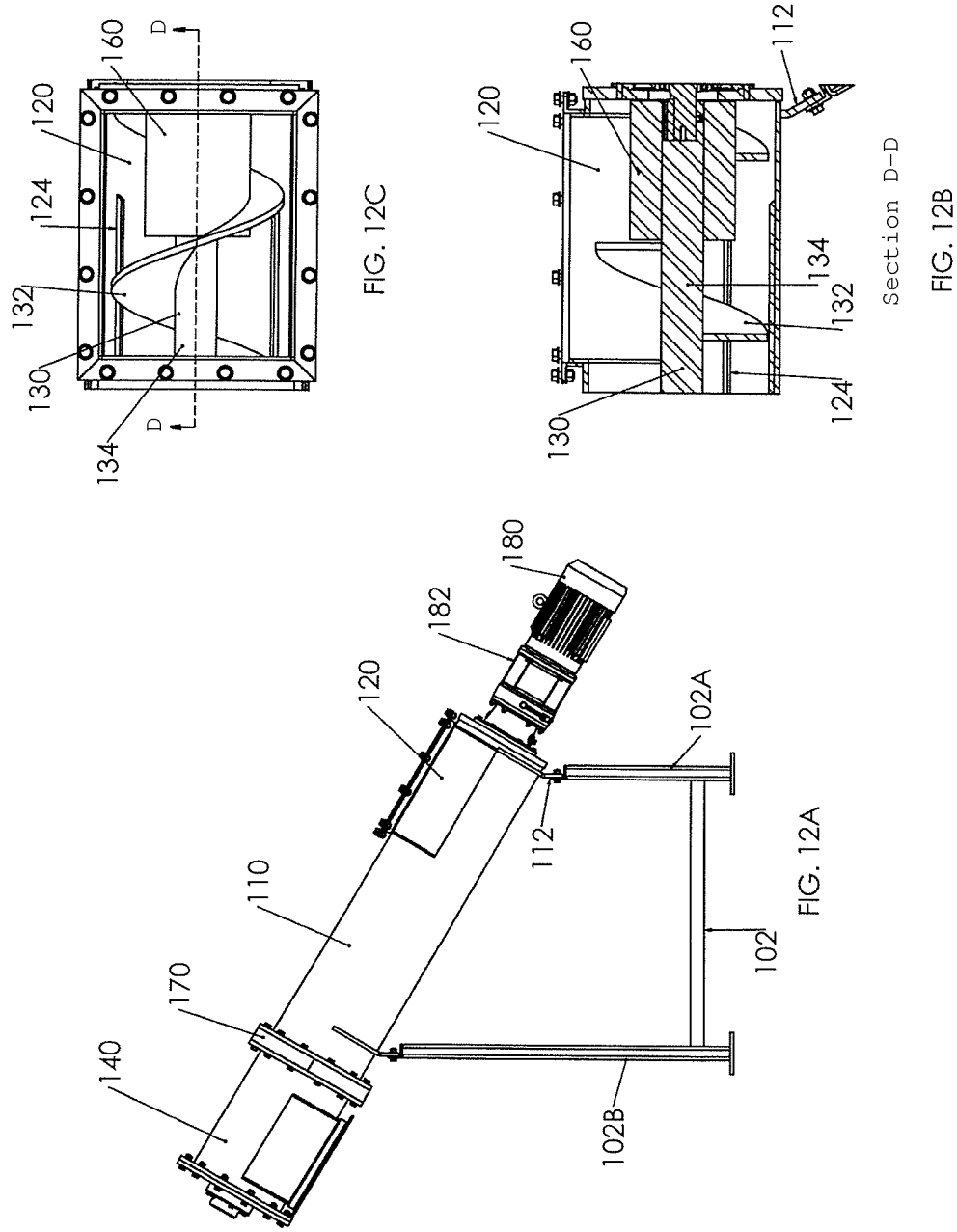

SYSTEM FOR CRUSHING WITH SCREW PORITION THAT INCREASES IN DIAMETER

CROSS-REFERENCE TO RELATED APPLICATIONS

This application claims the benefit of U.S. Provisional Application No. 61/421,505, filed Dec. 9, 2010, which is hereby incorporated by reference as if fully recited herein.

BACKGROUND AND SUMMARY OF THE INVENTION

Exemplary embodiments of the invention are related to a crusher. A crusher may also be known as a compactor. More particularly, exemplary embodiments may include a crusher having an inverse tapered shaft (i.e., reverse tapered shaft) that may utilize a smaller amount of energy than known crushers. A further exemplary embodiment relates to a crusher that includes components that may be more easily replaced than conventional screw crushers to reduce long-term cost of the crusher during use thereof. Also, the screw crusher may facilitate the movement of compacted or compressed material better than known crushers.

The amount of materials ending up in landfills is continuously increasing. As the scarcity of landfill space increases, along with more stringent environmental regulations, there have been increased efforts to reduce the amount of waste produced by individuals, in addition to an increased effort to recycle materials. Many different processes and machines have been developed to facilitate combating this ever-increasing problem.

One of the major contributing materials to landfill overflow are plastics. Many plastics take a very long period of time to biodegrade, if they biodegrade. These types of plastics may also be resistant to photolysis. Furthermore, certain types of lightweight plastics may not only float on water, but may also blow in the wind, causing an abundant amount of litter, especially along shores and waterways.

Additionally, in certain manufacturing settings when plastic products, for example, plastic beverage bottles, do not meet desired characteristics and/or tolerances, the filled or unfilled beverage bottles or containers may need to be recycled. In some scenarios, the liquid containers may already have been at least partially filled with liquid before a device recycles the container. There is a need to deliquify such filled containers in order to facilitate recycling.

To combat the littering problem that comes with the use of plastics, different machines and methods of recycling have been developed. Different machines and methods have been developed to facilitate compaction and/or compression of plastics and other materials that may be recycled. In association with recycling, compaction may facilitate the reduction of pentane gas dangers. Also, the compaction process may reduce storage requirements and reduce hauling and/or handling costs.

Known crushers may not adequately address the aforementioned needs. A primary shortcoming of known crushers is the failure to crush all of the material fed to it. For example, when crushing containers, known crushers commonly allow a certain number of containers to pass through the system without being crushed. This is particularly problematic with filled containers. Among other things, this can lead to increased recycling time and costs. For example, uncrushed containers may necessitate increased time in a baling machine in order to crush the previously uncrushed containers.

Additionally, known crushers that are used to crush or compact plastics are typically engineered to crush or compact one specific type of material and/or product. In an example, a known crusher may be engineered to crush 12 oz. aluminum beverage cans. To facilitate the compaction or crushing of other materials or products, the known crusher or compactor must be refabricated. The requirement of specific crushers for each different material and/or product leads to added overhead costs to companies that wish to crush or compact multiple different materials and/or products using a singular machine. In one example, it may be preferred that a single machine may crush or compact both a beverage can and produce.

Furthermore, known crushers are not self-cleaning when in use. For example, known crushers commonly become clogged with scraps of various sorts (e.g., labels or other parts of the material being processed) after a period of use. The material can accumulate and eventually hinder or prevent further use of known crushers. Known crushers typically require that an individual disassemble the machine to clean the machine of a crushed material before a second material may be crushed. In one example, for a known crusher to first crush produce and then crush plastic bottles, the known crusher would have to be disassembled after crushing the produce before the plastic bottles could be crushed. This adds both time and cost to crushing multiple types of different materials.

There are currently three different types of compaction methods that may be used to compact plastics and other materials: heat extrusion, ram compaction, and screw compaction using an auger or compactor/compression screw. The known screw crushers and related methods are less than ideal for compressing or compacting materials. One of the main problems that occur during the compaction process is that the mechanical components used to contact the plastic throughout the screw compaction process may wear due to high friction, creating undesirable tolerances between components of the crusher. This is especially true when known screw crushers continuously run for extended periods of time, or in situations where there is high friction within the screw crusher. The high friction may also demand higher power input to the crusher. For instance, a high horsepower motor may be needed to prevent shutdown due to the high friction and continue to advance the compressed material out of the crusher.

Crushers that use screw compaction have an especially inherent problem with wear of components due to the friction within the chamber and other areas. This occurs when there is a substantial coefficient of friction between the material and typically a surface within the chamber of the compression screw. The friction between the material and a portion of the chamber may lead to undesirable tolerances between components of the crusher. As such, an apparatus and method of replacing or modifying the component or components that wear due to friction and other sources is desired. Ceasing the continuous operation of the crusher may add extra time and cost to the recycling process. Additionally, in some instances, total compaction of a product may not be desired due to higher energy requirements or increased wear on the equipment. In some of those circumstances, a crusher is desired that withstands the compaction or compression of materials but utilizes a smaller amount of energy than known crushers.

Given the problems that exist with known screw crushers, there is need for a crusher that crushes 100% of the material fed to it (e.g., 100% crushing or flattening of containers). A crusher that incorporates components that minimize the cost associated with use is also desired. Furthermore, providing a crusher that provides an efficient means to replace worn components on the chamber or other mechanical components is also desirable. Furthermore, it is desired that the crusher may run on a substantially continuous basis by minimizing or eliminating a buildup of solid material mass that could stop or slow down the crusher. It may be desired to provide a crusher that utilizes a smaller amount of energy than known crushers. An exemplary crusher may also be desired that may remove liquids from containers. An exemplary crusher may be desired that reduces overhead costs to companies that wish to crush or compact multiple different materials and/or products (e.g., plastic bottles, metal cans, foods, other wastes, etc.) using a solitary crusher that does not need any component changed or replaced. Additionally, exemplary embodiments of crushers may allow multiple different materials to be crushed without the need to disassemble the crusher. An exemplary embodiment of a crusher of the present invention may satisfy some or all of these needs or preferences.

Although this application may talk about a crusher that employs the method of screw compaction to compress plastics and other materials, the crusher may be used in other applications other than compaction processes.

Exemplary embodiments of the crusher may crush 100% of the material that is fed to it (e.g., 100% flattening of containers). By crushing or flattening all of the material that is fed to it, the inventors have found that exemplary embodiments of a crusher may reduce the typical baling cost and operational time by up to approximately 70%. The reduced volume may also reduce transportation costs. For instance, one exemplary embodiment may reduce PET bottle volume by about 66%. Nonetheless, other results are possible.

Exemplary embodiments of a crusher may also include replaceable components that are subject to increased wear during use of the crusher. An example of the crusher may include an efficient means to replace worn components on or in the chamber, in addition to other mechanical components. Also, some exemplary embodiments may provide simplicity of operation with only essentially one moving part (e.g., a screw assembly).

Exemplary embodiments of the crusher may allow for substantially continuous use by minimizing or eliminating a buildup of solid material mass that could slow or stop the crusher. For instance, some exemplary embodiments may essentially be self-cleaning.

Exemplary embodiments are directed to a crusher and related methods. Certain embodiments of the crushers may be of multiple geometries and sizes that are used to compress or compact different materials. Unless expressly set forth, it is not intended to limit the invention to compacting particular materials.

In addition to the novel features and advantages mentioned above, other benefits will be readily apparent from the following descriptions of the drawings and exemplary embodiments.

BRIEF DESCRIPTION OF THE DRAWINGS

FIGS. 1A-1F are views of an exemplary embodiment of a crusher.

FIGS. 2A-2C are views of an exemplary embodiment of a crusher.

FIGS. 12A-12C are views of an exemplary embodiment that includes a metering bar.

DETAILED DESCRIPTION OF EXEMPLARY EMBODIMENT(S)

As seen in FIGS. 1-11, exemplary embodiments of a crusher 10 that may be adapted to compact plastics or other materials are illustrated. Exemplary embodiments may include a frame 102 with a proximal end 102A and a distal end 102B such that mounting bodies 104 are attached to the frame 102. In other exemplary embodiments, the frame 102 may be adapted to move on different surfaces with the inclusion of wheels or other devices that would facilitate movement thereof.

Figure 3A:
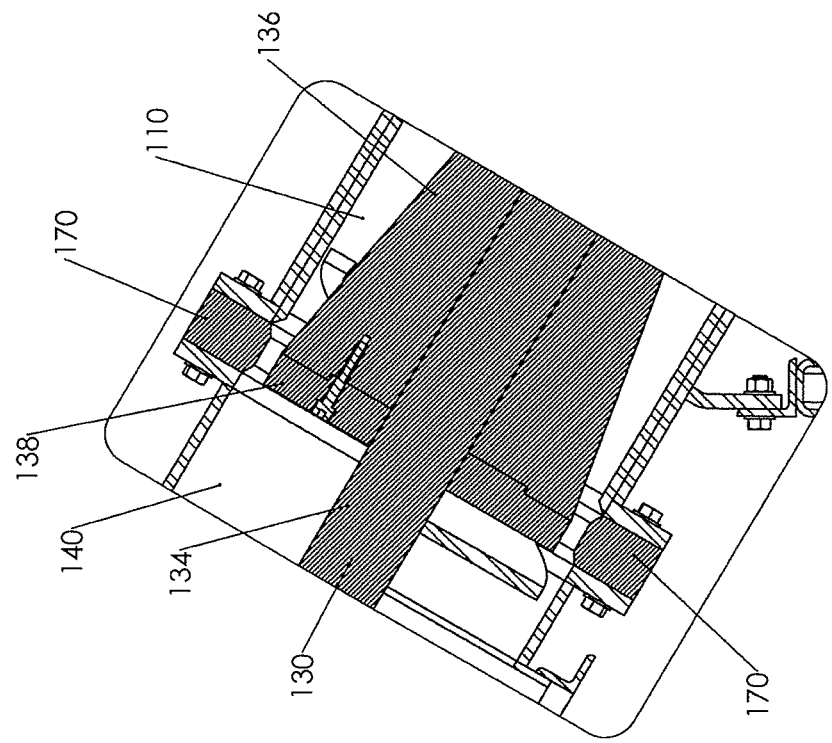
FIGS. 3A-3B are views of an exemplary embodiment of a crusher.
Figure 3B:
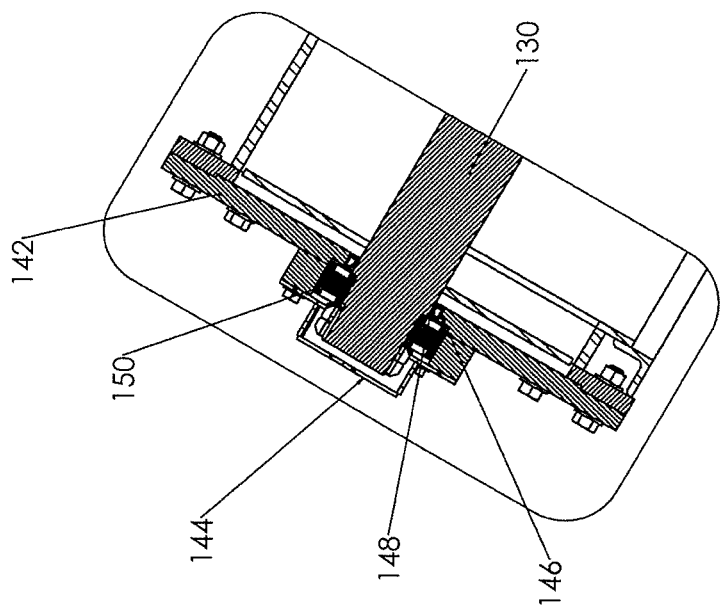
Figure 4:
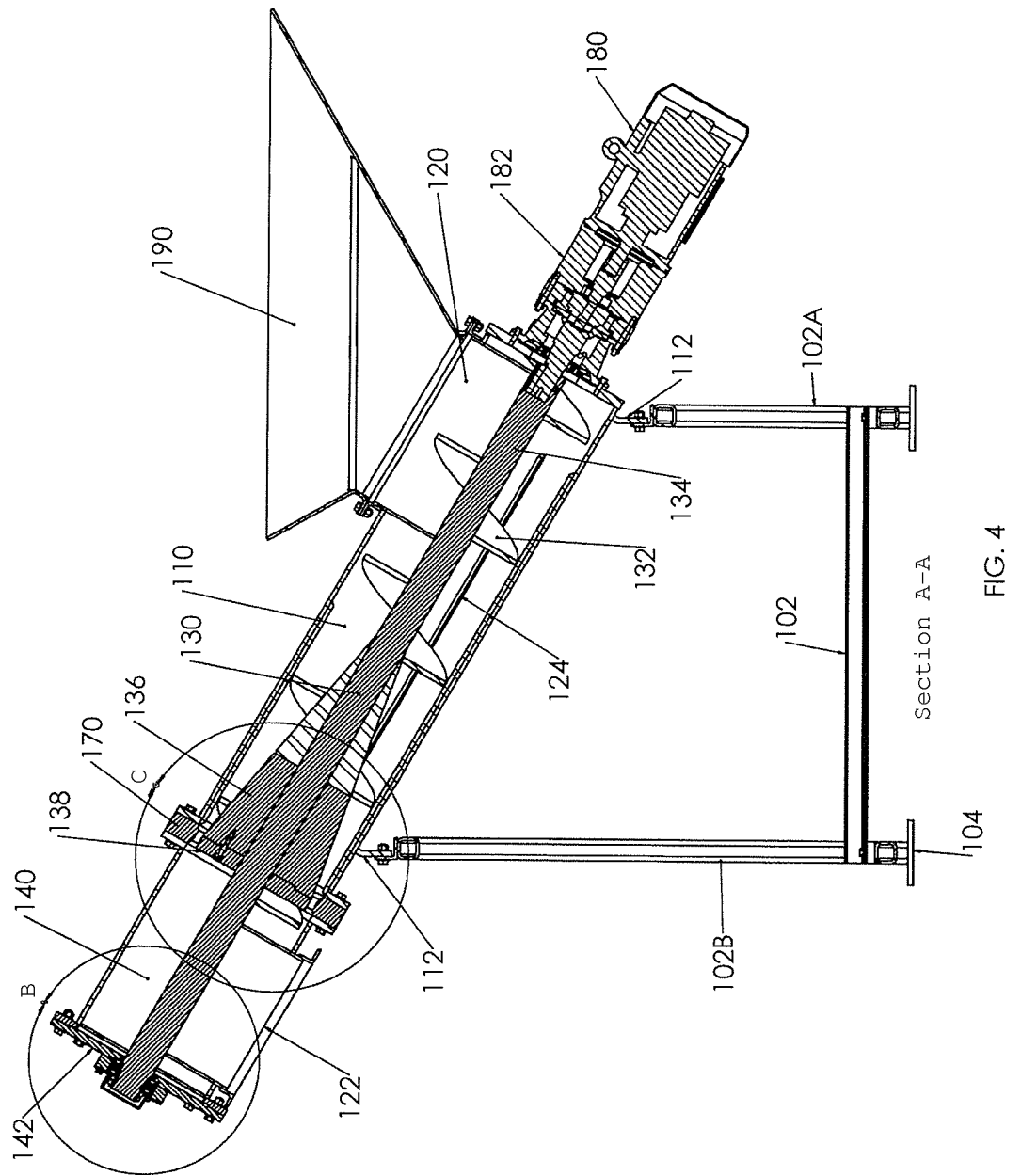
FIG. 4 is a cross-sectional view of an exemplary embodiment of a crusher.
Figure 5:
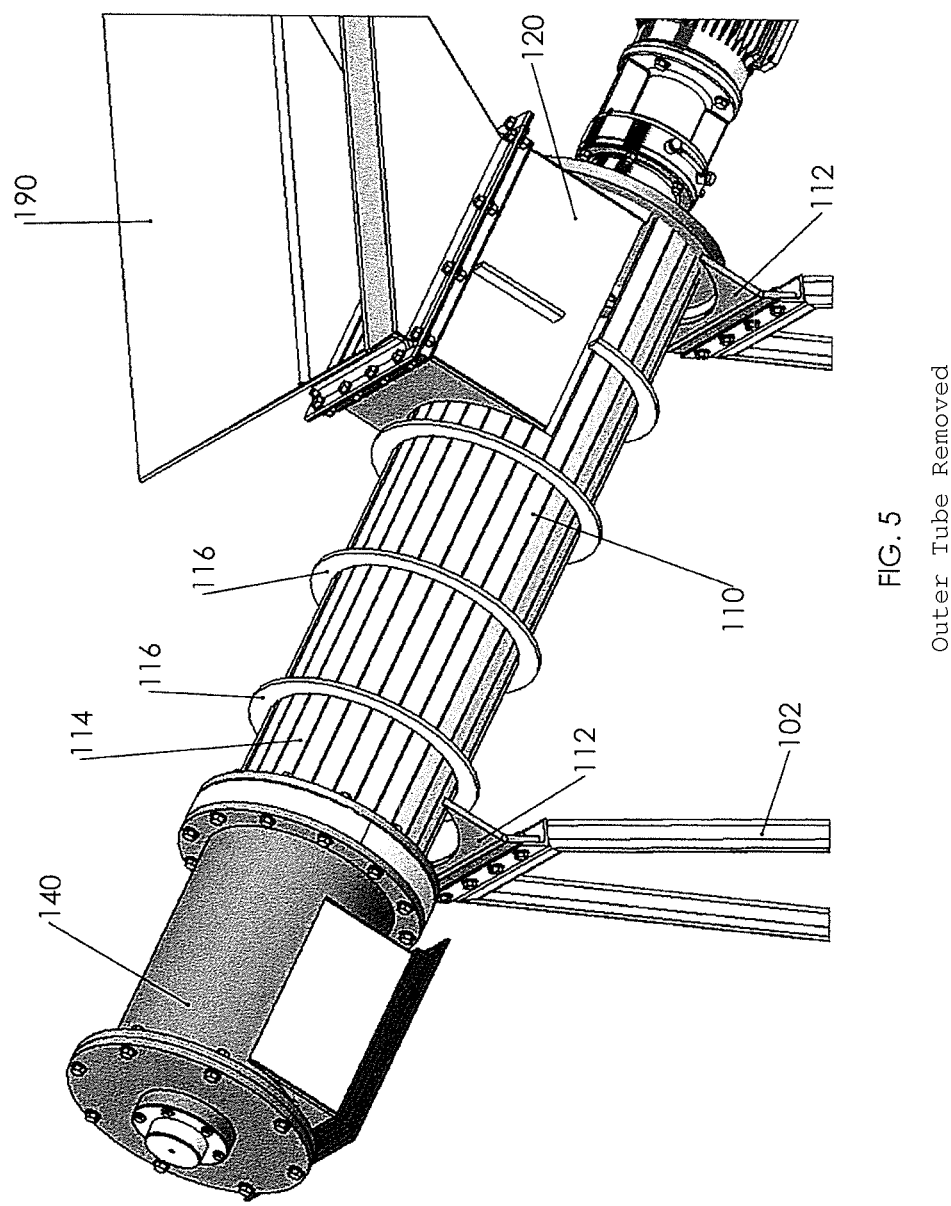
FIG. 5 is a perspective view of an exemplary embodiment of a crusher.
Figure 6:
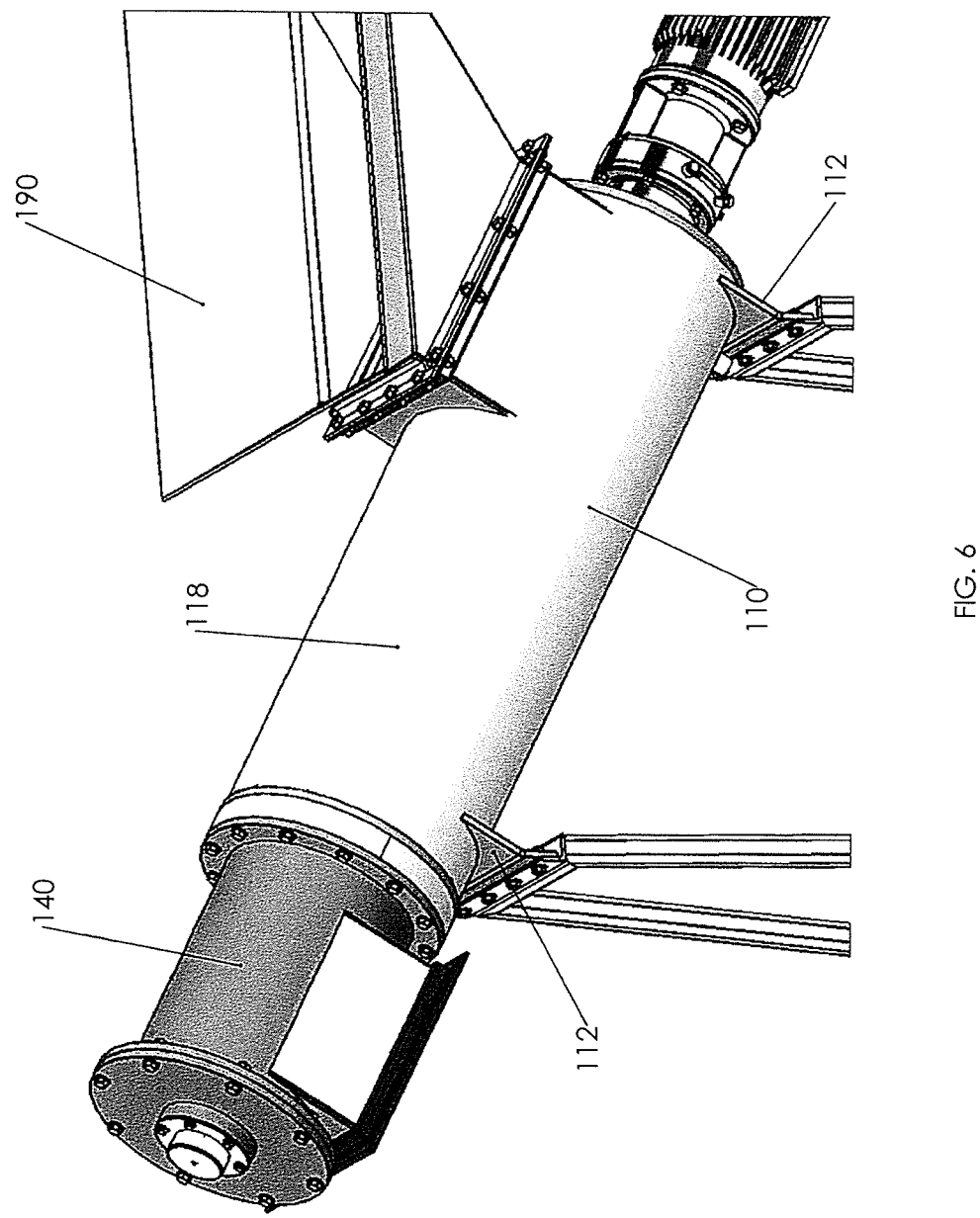
FIG. 6 is a perspective view of an exemplary embodiment of a crusher.
Figure 7:
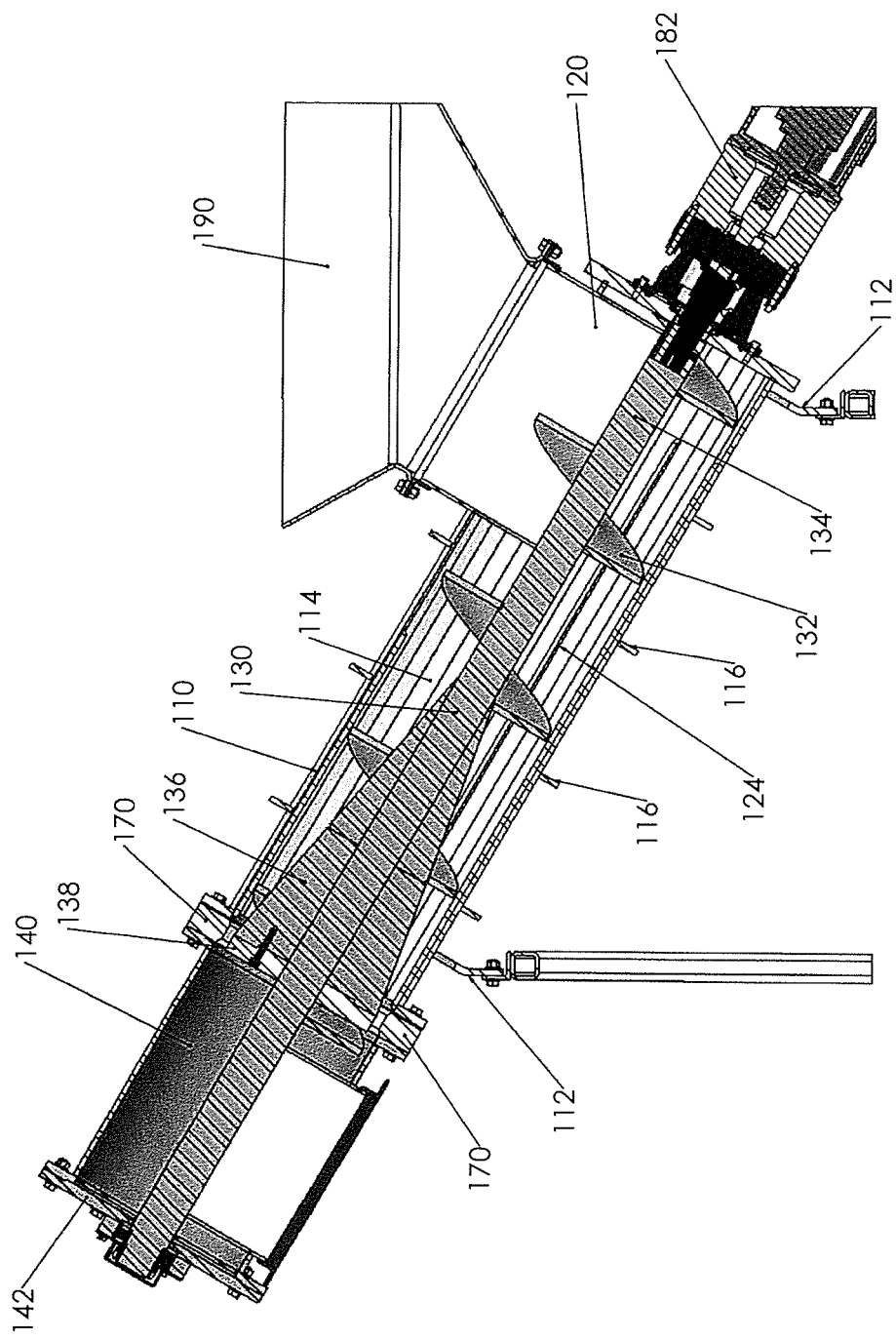
FIG. 7 is a cross-sectional view of an exemplary embodiment of a crusher.
Figure 8:
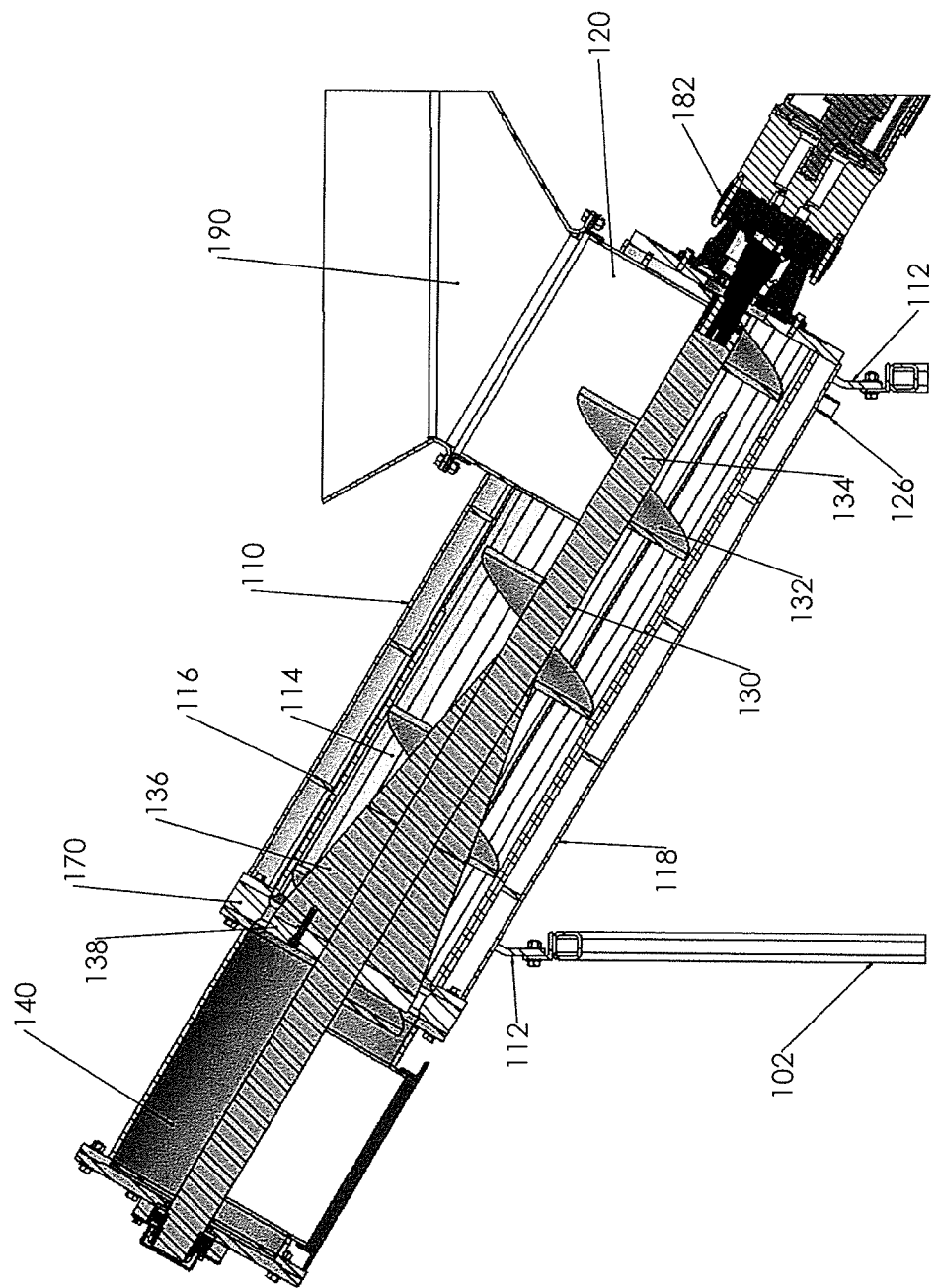
FIG. 8 is a cross-sectional view of an exemplary embodiment of a crusher.
Figure 9:
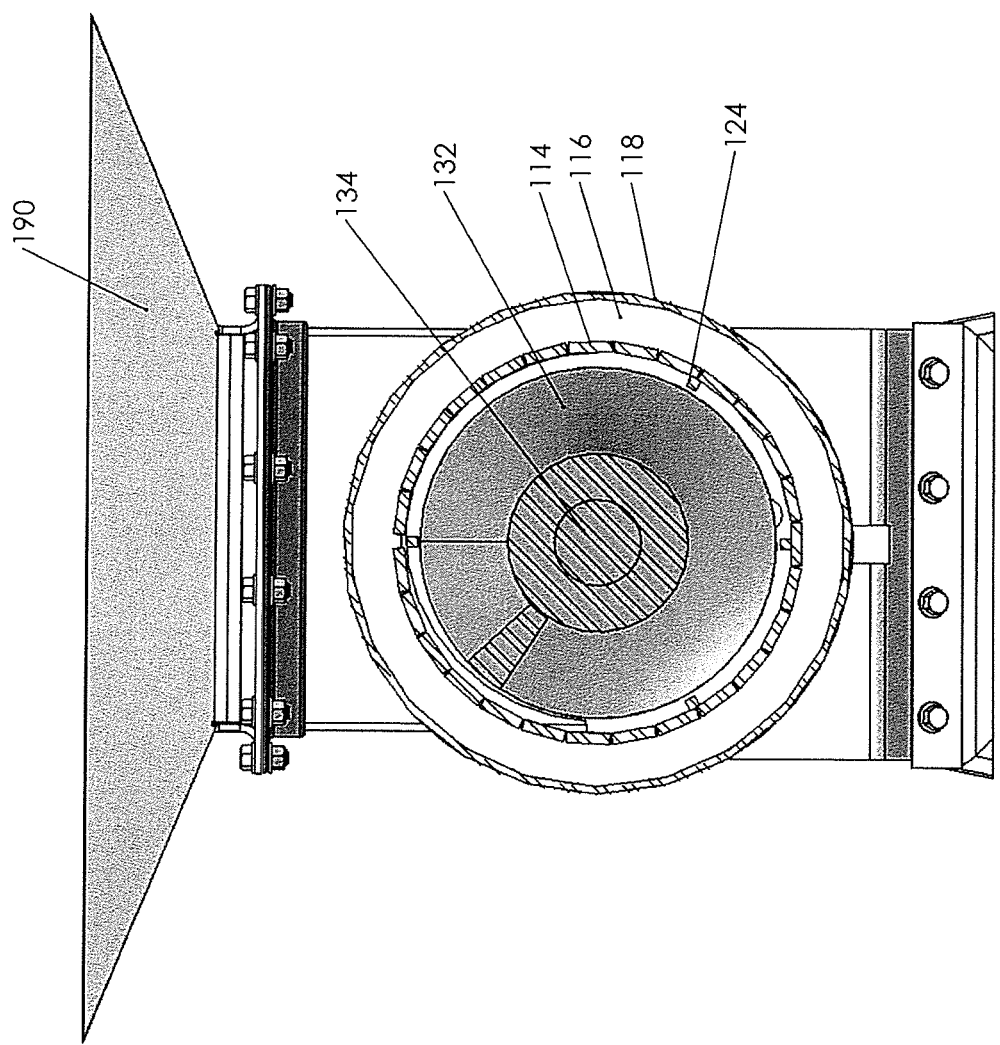
FIG. 9 is an elevated end view of an exemplary embodiment of a crusher.
Figure 10A:
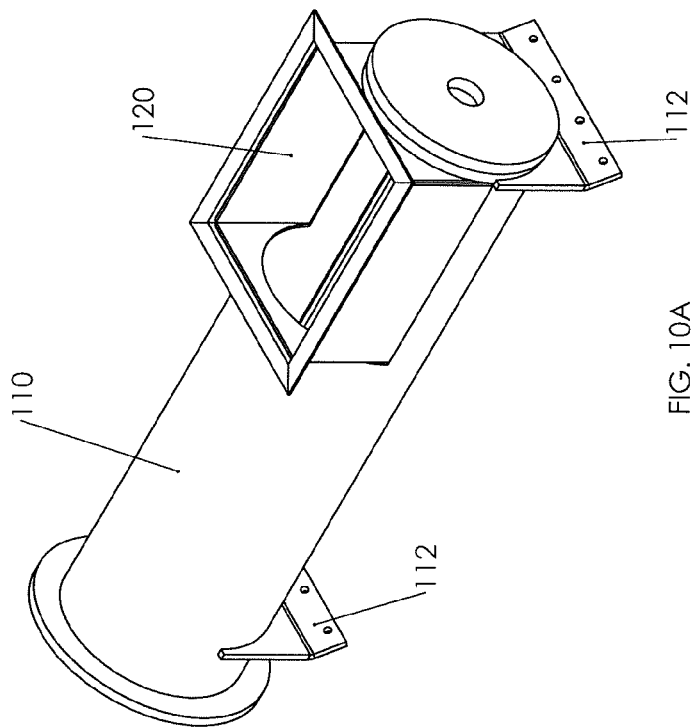
FIGS. 10A-10C are views of an exemplary embodiment of a compaction chamber of a crusher.
Figure 10B:
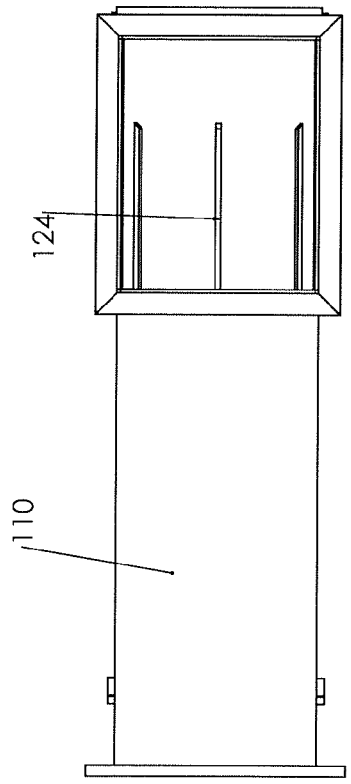
Figure 10C:
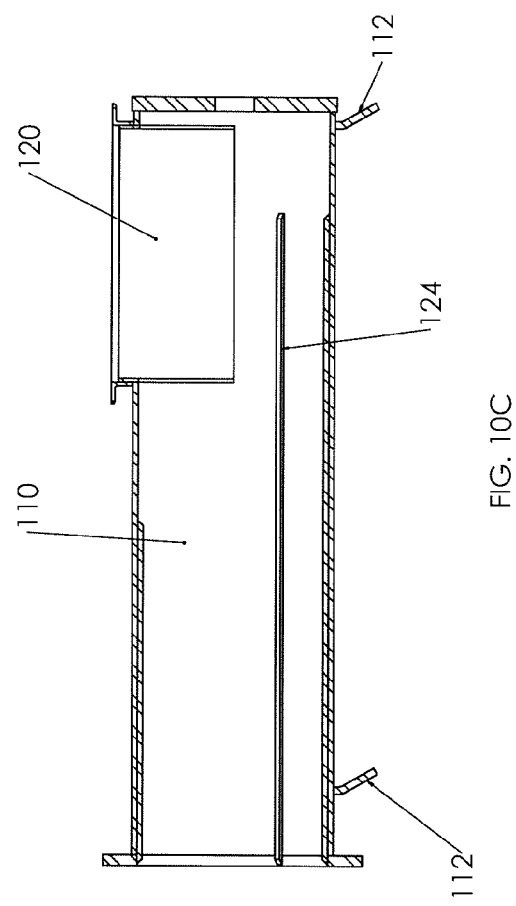

Exemplary embodiments of the crusher 10 may include a compaction chamber 110 that is mounted to the frame 102. The compaction chamber 110 may include one or more mounting bodies 112 that extend from the periphery thereof that facilitate mounting of the compaction chamber 110 with the frame 102. The compaction chamber 110 may be associated with the frame 102 by any number of means. However, in one example, threaded fasteners may facilitate the association. The compaction chamber 110 may be any number of geometries along the length. In exemplary embodiments, the compaction chamber 110 is substantially cylindrical along the length. Also, in some embodiments, as depicted in at least FIGS. 5 and 7, the compaction chamber 110 may include a series of longitudinal members 114 that are secured at desired positions by one or more securing members 116. The series of longitudinal members 114 and securing members 116 may provide a compaction chamber 110 that will remain substantially the same size as the surface of the compaction chamber 110 wears away through the action of the material therein. Some exemplary embodiments of the compaction chamber 110 may include a series of longitudinal members 114 and securing members 116 that are located within a substantially tubular body 118, as depicted in FIGS. 6 and 8. The compaction chamber 110 includes an inlet chamber 120 that is adapted to receive materials. The walls of the compaction chamber 110 may be fabricated from materials that are strong enough to withstand the force exerted by the materials that are compacted or compressed by the screw assembly 130 during use of the crusher 10. One example of the compaction chamber 110 may be substantially cylindrical in geometry, with at least one opening 122 at the distal exit portion of the compaction chamber 110 that allows the compressed or compacted material to exit. In this example, the proximal end of the inlet chamber 120 may allow a screw assembly 130 to pass through the proximal wall, and at least a portion of the top of the inlet chamber 120 may allow material to enter the compaction chamber 110. However, in other embodiments, the inlet chamber 120 may be any number of geometries and positions that allow material to enter the compaction chamber 110. In some examples, the inlet chamber 120 may have multiple openings, such as openings in the top surfaces of the compaction chamber 110, which allow material to enter the compaction chamber 110 for compression and/or compaction (e.g., at generally the same or different points along the length of the compaction chamber 110).

One or more flow bars 124 may be situated within at least a portion of the interior of the compaction chamber 110. The one or more flow bars 124 facilitate the flow of material being compacted within the compaction chamber during use of the crusher by helping push material (in concert with the screw flights) from the inlet chamber 120 to an outlet chamber 140.

The compaction chamber 110 may include one or more drain apertures 126, as depicted in FIG. 8, that facilitate the draining of liquids or other materials from within the compaction chamber 110. In one example, some exemplary embodiments of the crusher 10 may be used to compact or compress full or partially full plastic liquid containers. In this example, during the compaction process liquids contained within the bottles or other containers will empty within the compaction chamber 110. A drain aperture 126 may facilitate the removal of unwanted liquids. Additionally, some exemplary embodiments of the crusher 10 may include drain apertures 126 that facilitate the cleaning or maintenance of the crusher 10.

Exemplary embodiments of the compaction chamber 110 may include wedge wire (not shown) along at least a portion of the interior. The wedge wire may facilitate the compaction and advancement of the materials, along with facilitating the drainage of unwanted liquids from the compacted materials. The wedge wire may be added to or take the place of the longitudinal members 114 and securing member 116 in some exemplary embodiments.

Exemplary embodiments of the compaction chamber 110 house a screw assembly 130 that may be mounted to or otherwise extend generally between the proximal wall and distal wall of the compaction chamber 110. In exemplary embodiments, the screw assembly 130 may be secured to or otherwise in association with the compaction chamber 110 and/or frame by at least one bearing 150. In some embodiments, at least a portion of a bearing housing engages at least a portion of the proximal wall of the compaction chamber 110 that may encircle the opening contained therein to assure that material does not exit the proximal end of the compaction chamber 110. A gasket or similar device may also be placed between the bearing housing and the proximal wall of the inlet chamber 120 to effectuate a seal. In certain exemplary embodiments, at least one bearing 150 may also be contained in a bearing housing that engages the distal wall of an exit portion of the compaction chamber 110. A bearing housing may be any number of geometries depending on the number and types of bearings used. However, in some specific embodiments, the bearing housing is substantially cuboid or cylindrical.

The screw assembly 130 may include one or more flights 132 in exemplary embodiments. Exemplary embodiments of the screw assembly shaft 134 may include a portion 136 that increases in diameter from the proximal to the distal end of the assembly 130. In exemplary embodiments, the portion of increased diameter 136 may be integral with the rest or the shaft 134. However, in some embodiments, the portion of increased diameter 136 may be associated with the shaft 134 by welding or other methods. Exemplary embodiments of the distal end of the screw assembly 130 may include a flattened portion 138 that facilitates the compaction of the materials. The flattened portion 138 may help ensure that the desired thickness of compacted material is produced by the gap between a portion of the compaction chamber 110 and the screw assembly 130.

Exemplary embodiments of the screw assembly 130 may include one or more flights 132 along the length thereof. The flights 132 may be integral with the screw assembly in some embodiments, but may be associated with the screw assembly in any suitable manner in other embodiments. The flights 132 may be any number of geometries and may or may not be continuous along the entire length of the screw assembly 130. The flights 132 may have the same geometry along the entire length of the screw assembly 130 or may change geometry along the length. In one example, the geometry of the flights 132 may be substantially the same along the length of the screw assembly, except along the portion 136 that increases in diameter. For example, along the portion 136 that increases in diameter, the flight geometry may stay the same, except that the lower portion of the flight is theoretically removed to compensate for the increased diameter of the shaft along the length of the screw assembly (i.e., the height of the flight may decrease toward the distal portion of the compaction chamber). In other exemplary embodiments, the height of the flight may remain the same along portion 136, which would necessitate a corresponding increase in the diameter of the compaction chamber 110.

Exemplary embodiments of the screw assembly 130 may include a metering member 160, such as a metering bar or metering tube along at least a portion of the length thereof, as depicted in at least FIGS. 12A-12C. In some embodiments, the metering bar or tube 160 may be integral with at least a portion of the screw assembly 130. However, in other embodiments, the metering bar or tube 160 may be removably attached with at least a portion of the screw assembly 130. In some exemplary embodiments, the metering bar or metering tube 160 may be associated with the proximal end portion of the screw assembly 130. The metering bar or tube 160 may be varying diameters or thicknesses, depending upon the desired size (e.g., thickness) of the material being compacted during use of the compacter. Furthermore, by increasing or decreasing the size of the metering bar or tube, both in terms of length and/or diameter, regulation and metering of the volume of material in the processing chamber may be better controlled.

Exemplary embodiments of the compaction chamber 110 may include an outlet chamber 140 located at the distal end portion thereof that is configured to facilitate the removal of compacted material. The walls of the outlet chamber 140 may be fabricated from materials that are strong enough to withstand the force exerted by the materials that are compacted by the screw assembly 130 during use of the crusher 10. One example of the outlet chamber 140 may be substantially cylindrical in geometry, with at least one opening at the proximal end of the outlet chamber 140 that allow the compressed material to enter. In this example, the proximal end of the outlet chamber 140 may allow a screw assembly 130 to pass through the proximal wall, and the crushed material may enter the outlet chamber 140. However, in other embodiments, the outlet chamber 140 may be any number of geometries that allow suitable reception of the crushed material to occur. In this example, the outlet chamber 140 may have at least one additional opening, such as an opening in the bottom or other suitable surface, which allows compacted material to exit the compaction chamber 110.

In exemplary embodiments, an end cap 142 may be associated with at least a portion of the distal end of the outlet chamber 140. Exemplary embodiments of the end cap 142 may include a void adapted to hold a bearing 150 and/or an end portion of the screw assembly 130 and facilitate the rotational movement of the screw assembly during use. The end cap 142 may be associated with the outlet chamber 140 in any number of techniques, including but not limited to: threaded fasteners, welding, adhesives, etc., that allow desired functionality of the crusher. Furthermore, one or more gaskets or similar devices may be situated between at least a portion of the end cap 142 and the outlet chamber 140 to facilitate a tight seal therebetween. Exemplary embodiments may further include an end body 144 that facilitates securement of the screw assembly 130 within the compaction chamber 110. An example of the end body 144 may house a locknut and lock washer that maintain the bearing 150 and screw assembly 130 within a desired position during use of the crusher 10. A seal 146 and a sleeve 148 may be included in exemplary embodiments. The seal 146 and sleeve 148 may effectuate a desired obstruction of material during use.

Exemplary embodiments of the compaction chamber 110 may include one or more wear members 170 that may decrease the amount of components and downtime needed to effectuate the maintenance of the crusher after wear has occurred. For example, during typical wear of the crusher, friction between the material being compacted and the screw assembly and/or interior wall of the compaction chamber 110 may wear down the screw assembly and/or the interior wall. Wearing down of the screw assembly and/or the interior wall of the compaction chamber 110 may produce an undesired space therebetween that leads to larger than desired final compacted material thicknesses. Therefore, the inclusion of one or more wear members 170 at the critical points along the compaction chamber 110 that see the most friction and wear may provide for improved performance of the crusher 10 and require less time and materials when wear does occur.

The one or more wear members 170 are set at a desired distance from the screw assembly 130 to produce crushed material of a desired thickness. As opposed to known crushers, exemplary embodiments may ensure 100% compaction of material, as other crushers allow non-flattened material to pass through a door, squeeze or clam shell portion of the crusher. Exemplary embodiments do not allow uncrushed material to pass through the opening between the one or more wear members and the screw assembly, guaranteeing that essentially 100% of the material passing through the crusher exits at a desired thickness.

In some exemplary embodiments, the one or more wear members 170 may be situated towards the proximal end of the outlet chamber 140 along the body of the compaction chamber 110. In one exemplary embodiment, the wear members 170 may be mechanically fastened to the outlet chamber 140 and/or compaction chamber 110 such as with the use of one or more threaded fasteners 172 (e.g., bolts) and washers 174. Other suitable mechanical fasters may also be used including, but not limited to, screws, clamps, and clips.

Figure 11:
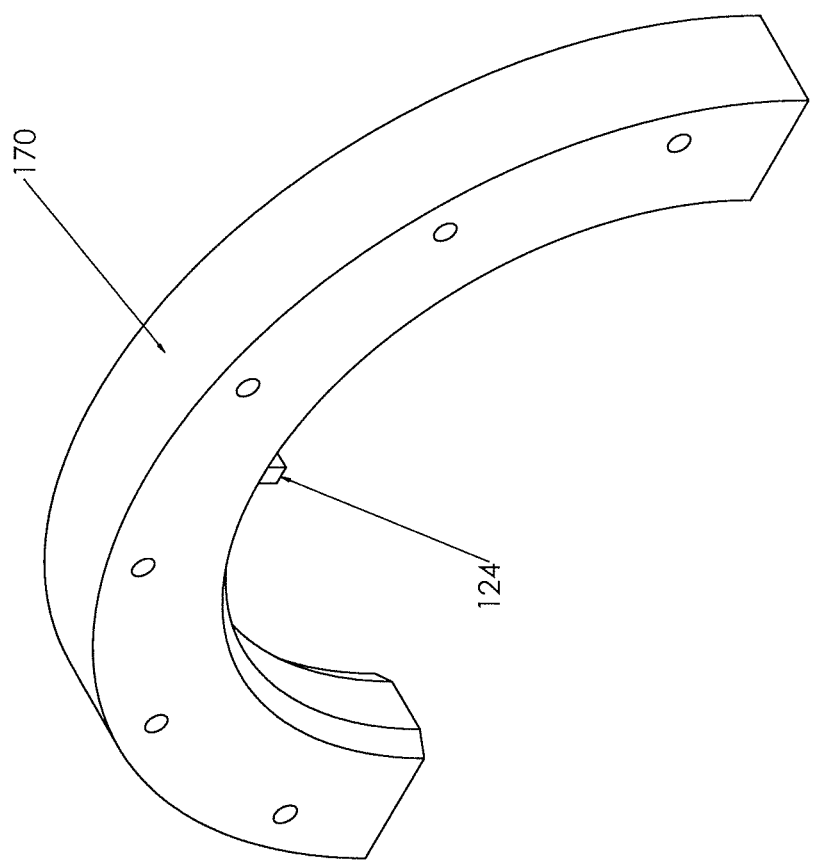
FIG. 11 is a perspective view of a portion of an exemplary embodiment of a wear member.

The one or more wear members 170 may be any number of geometries, depending upon design characteristics and the connection between the outlet chamber 140 and the compaction chamber 110. However, in one example, the wear members 170 are substantially ring-shaped when associated together. Although one ring-shaped wear member may be used, in other exemplary embodiments, any number of partial ring-shaped members may be combined to form a final associated geometry. In some exemplary embodiments, the one or more members may be hingedly attached or attached by another means to effectuate the formation of the final desired associated geometry. In some exemplary embodiments, the wear member 170 may include a portion of a flow bar 124, as depicted in FIG. 11.

Although not shown, exemplary embodiments of the crusher 10 may include an electrical junction box (not shown) that may be mounted on the frame 102. However, the electrical junction box may be positioned at other suitable locations associated with the crusher 10, including other enclosures. The electrical junction box may be in electrical association with and facilitate the operation of components that utilize electricity included in exemplary embodiments of the crusher 10.

Exemplary embodiments of the crusher 10 may include an electric motor 180 to turn the screw assembly 130 that is mounted on the frame 16. In one example, the motor 180 is a dual-voltage three phase TEFC motor that is variable speed. In another example, the motor 180 may be 10 hp that facilitates an exemplary crusher to compact approximately 300-400 lbs of material per hour. Yet another example may include a 3 hp 230 volt single phase drive (capable of producing approximately 1,431 ft/lbs of torque), which may be configured to efficiently process approximately 300-400 lbs per hour of, for example, PET bottles. However, in other exemplary embodiments, other motors may be used that are able to suitably rotate the screw assembly 130, including motors that are operated by power sources other than electricity. However, an electric motor may be preferred because the electric motor may not emit any toxic emissions, unlike other motors that may be used. Also, some exemplary embodiments may not include any hydraulics or other components that may have a tendency to create oily messes.

In some exemplary embodiments, a gearbox or reducer 182 may be in association with the motor 180 to allow a user to vary the rotation speed of the screw assembly 130 during operation of the crusher 10. In one example, a hollow-shaft gearbox or reducer may be used. By including a gearbox or reducer, a smaller motor may be used to provide the required torque to suitably operate the crusher. In exemplary embodiments that include a gearbox or reducer 182, the gearbox or reducer 182 may be used in association with the proximal end of the screw shaft. However, in other embodiments, the motor 180 and/or gearbox 182 may be in association with other portions of the screw assembly 130 to facilitate rotation thereof. In some examples, a variable frequency drive (VFD) (not shown) may be used to control the rotational speed of the screw assembly 130. In some embodiments, a coupler may facilitate the transfer of rotational movement from the motor 180 to the screw assembly 130. In one example, a tapered shaft coupling is used, although other types of couplers may be used in other embodiments. The motor 180 and/or associated gearbox 182 may be situated at either end of the crusher, depending on desired design characteristics, etc.

Some exemplary embodiments of the crusher 10 may include an infeed hopper 190. In exemplary embodiments, at least a portion of the lower surface of the infeed hopper 190 may be mounted to engage at least the upper surface of the compaction chamber 110 by the use of a mounting body that is adapted therefore. In other exemplary embodiments, an infeed hopper 190 may have any suitable association with the compaction chamber 110. Exemplary embodiments of at least a portion of the infeed hopper 190 may be substantially an inverted pyramid in geometry, with at least one opening at the peak end and the base end of the hopper 190. In other embodiments, any number of infeed hopper geometries may be used to facilitate the introduction of material within the compaction chamber 110. In some exemplary embodiments, the infeed hopper 190 may include a cover or similar device (not shown) that may reduce the likelihood of materials flowing back up the hopper during use of the crusher 10.

Exemplary embodiments of the crusher 10 may include an enclosure that covers the motor 180 and/or reducer 182. The enclosure may be mounted to the frame 102 or brackets extending from the frame. Exemplary embodiments of the enclosure may include one or more access panels that allow an individual to access the components contained therewithin. The access panels may be positioned wherever it is desired to access the components within the enclosure.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A system for crushing a material, comprising:
a compaction chamber including an inlet chamber at a proximal portion configured to receive the material and an outlet chamber at a distal portion configured to allow crushed material to exit, said compaction chamber further comprising at least one wear member removably associated with the distal portion of the compaction chamber, said at least one wear member comprised of a first wear member and a second wear member that are configured to form a ring; and
a screw assembly comprising a shaft that generally extends between the proximal and distal portions of the compaction chamber, a portion of the screw assembly increasing in diameter along a length of the shaft from the proximal portion to the distal portion of the compaction chamber such that the system is configured to crush the material between the compaction chamber and the portion of the screw assembly that increases in diameter.

2. A system for crushing a material, comprising:
a compaction chamber including an inlet chamber at a proximal portion configured to receive the material and an outlet chamber at a distal portion configured to allow crushed material to exit, said compaction chamber further comprising at least one wear member removably associated with the distal portion of the compaction chamber; and
a screw assembly comprising a shaft that generally extends between the proximal and distal portions of the compaction chamber, a portion of the screw assembly increasing in diameter along a length of the shaft from the proximal portion to the distal portion of the compaction chamber such that the system is configured to crush the material between the compaction chamber and the portion of the screw assembly that increases in diameter;
wherein the at least one wear member is configured to define a gap between the compaction chamber and the screw assembly through which the crushed material passes to the outlet chamber.

3. The system of claim 2 wherein the at least one wear member is configured to be removable in order to adjust the size of the gap between the compaction chamber and the screw assembly.

4. The system of claim 3 wherein the at least one wear member is comprised of a first wear member and a second wear member that are configured to form a ring.

5. The system of claim 2 wherein the compaction chamber is substantially cylindrical along its length.

6. The system of claim 2 wherein the compaction chamber includes a series of longitudinal members secured by at least one securing member along the length of the compaction chamber.

7. The system of claim 6 wherein the at least one securing member is configured to form at least one substantially circular ring such that an interior face of each ring is associated with an exterior face of each longitudinal member.

8. The system of claim 6 wherein the compaction chamber includes a substantially tubular member such that an interior surface of the substantially tubular member is associated with the at least one securing member.

9. The system of claim 2 further comprising at least one flow bar situated within at least a portion of an interior face of the compaction chamber to facilitate flow of the material.

10. The system of claim 9 wherein the at least one wear member includes a portion of the at least one flow bar.

11. The system of claim 2 further comprising a drain aperture associated with the compaction chamber.

12. The system of claim 2 further comprising wire mesh associated with at least a portion of an interior face of the compaction chamber.

13. The system of claim 2 wherein the screw assembly includes a flattened portion associated with the portion of the screw assembly that increases in diameter such that the flattened portion facilitates the crushing of materials to a desired thickness.

14. The system of claim 2 further comprising a metering member associated with at least a portion of the screw assembly to regulate the volume of material in the compaction chamber.

15. The system of claim 2 wherein the portion of the screw assembly that increases in diameter is integral with the shaft of the screw assembly.

16. A system for crushing a material, comprising:
a compaction chamber including an inlet chamber at a proximal portion configured to receive the material and an outlet chamber at a distal portion configured to allow crushed material to exit, the compaction chamber further comprising at least one wear member removably associated with the distal portion of the compaction chamber; and
a screw assembly comprising a shaft that generally extends between the proximal and distal portions of the compaction chamber, the shaft comprising a portion that increases in diameter toward the distal portion of the compaction chamber, the shaft further comprising a flattened portion associated with the portion of the screw assembly that increases in diameter;
wherein the at least one wear member extends around the flattened portion of the screw assembly; and
wherein the system is configured to crush the material between the compaction chamber and the screw assembly.

17. A system for crushing a material, comprising:
a compaction chamber including an inlet chamber at a proximal portion configured to receive the material and an outlet chamber at a distal portion configured to allow crushed material to exit, the compaction chamber further comprising at least one wear member removably associated with the distal portion of the compaction chamber; and a screw assembly comprising a shaft that generally extends between the proximal and distal portions of the compaction chamber, the shaft comprising:

a portion that increases in diameter toward the distal portion of the compaction chamber;

a flight that extends about the portion that increases in diameter such that the height of the flight decreases toward the distal portion of the compaction chamber; and a flattened portion associated with the portion of the screw assembly that increases in diameter;

wherein the at least one wear member extends around the flattened portion of the screw assembly; and wherein the system is configured to crush the material between the at least one wear member and the flattened portion of the screw assembly.

18. The system of claim 2 wherein the at least one wear member is comprised of a first wear member and a second wear member that are configured to form a ring.

19. The system of claim 16 wherein said at least one wear member is comprised of a first wear member and a second wear member that are configured to form a ring.

20. The system of claim 16 wherein the at least one wear member is configured to define a gap between the compaction chamber and the screw assembly through which the crushed material passes to the outlet chamber.

21. The system of claim 17 wherein said at least one wear member is comprised of a first wear member and a second wear member that are configured to form a ring.

22. The system of claim 17 wherein the at least one wear member is configured to define a gap between the compaction chamber and the screw assembly through which the crushed material passes to the outlet chamber.

* * * * *

UNITED STATES PATENT AND TRADEMARK OFFICE
CERTIFICATE OF CORRECTION

PATENT NO. : 8,708,266 B2  
APPLICATION NO. : 13/007864  
DATED : April 29, 2014  
INVENTOR(S) : Mark E. Koenig et al.

Page 1 of 1

It is certified that error appears in the above-identified patent and that said Letters Patent is hereby corrected as shown below:

On the Title Page, Item (54) and in the Specification, Column 1, line 2, in the Title:
Please delete "porition" and insert --portion--.

In the Specification:
Column (7) Line 52, please delete "fasters" and insert --fasteners--.

Signed and Sealed this  
Twenty-second Day of July, 2014

Michelle K. Lee  
*Deputy Director of the United States Patent and Trademark Office*